US010116425B2

United States Patent

(12) United States Patent
Zimmerman

(10) Patent No.: US 10,116,425 B2
(45) Date of Patent: Oct. 30, 2018

(54) DIPLEXED ANTENNA WITH SEMI-INDEPENDENT TILT

(71) Applicant: CommScope Technologies LLC, Hickory, NC (US)

(72) Inventor: Martin L. Zimmerman, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 534 days.

(21) Appl. No.: 14/812,339

(22) Filed: Jul. 29, 2015

(65) Prior Publication Data

US 2016/0134412 A1 May 12, 2016

Related U.S. Application Data

(60) Provisional application No. 62/169,782, filed on Jun. 2, 2015, provisional application No. 62/077,596, filed on Nov. 10, 2014.

(51) Int. Cl.

*H04L 5/08* (2006.01)
*H01Q 1/24* (2006.01)
*H01Q 3/30* (2006.01)
*H01Q 5/00* (2015.01)

(52) U.S. Cl.

CPC ............... *H04L 5/08* (2013.01); *H01Q 1/246* (2013.01); *H01Q 3/30* (2013.01); *H01Q 5/00* (2013.01)

(58) Field of Classification Search

CPC ............. H01Q 1/12; H01Q 5/335; H04L 5/08
See application file for complete search history.

(56) References Cited

U.S. PATENT DOCUMENTS

| | | | |
|---|---|---|---|
| 4,689,627 A | 8/1987 | Lee et al. | |
| 6,864,837 B2 | 3/2005 | Runyon et al. | |
| 7,173,572 B2 | 2/2007 | Teillet et al. | |
| 7,312,751 B1 * | 12/2007 | Voyce | H01Q 1/52 342/379 |
| 2006/0077098 A1 * | 4/2006 | Zimmerman | H01Q 1/243 342/372 |
| 2006/0109066 A1 * | 5/2006 | Borysenko | H01P 1/185 333/164 |
| 2007/0008236 A1 | 1/2007 | Tillery et al. | |
| 2009/0322610 A1 | 12/2009 | Hants et al. | |
| 2012/0087284 A1 | 4/2012 | Linehan et al. | |
| 2012/0280882 A1 | 11/2012 | Zimmerman et al. | |

(Continued)

FOREIGN PATENT DOCUMENTS

GB 2 384 369 A 7/2003

OTHER PUBLICATIONS

Notification Concerning Transmittal of International Preliminary Report on Patentability Corresponding to PCT/US2015/045008, dated May 26, 2017, 9 pages.

(Continued)

*Primary Examiner* — Jamal Javaid
(74) *Attorney, Agent, or Firm* — Myers Bigel, P.A.

(57) ABSTRACT

Systems and methods for a diplexed antenna with semi-independent tilt are disclosed. The diplexed antenna supports two or more frequency bands, in which the vertical tilt of each of the supported frequency bands is separately controlled by a coarse level of phase shifting, but commonly controlled by a fine level of phase shifting.

20 Claims, 15 Drawing Sheets

(56) References Cited

U.S. PATENT DOCUMENTS

2013/0214973 A1* 8/2013 Veihl ........................ H01Q 3/40
342/373
2013/0294302 A1 11/2013 Hofmann et al.
2014/0062834 A1 3/2014 Jidhage et al.
2014/0225792 A1* 8/2014 Lee ........................ H01Q 21/30
343/729

OTHER PUBLICATIONS

Int'l Search Report & Written Opinion dated Nov. 24, 2015 in Int'l Application No. PCT/US2015/045008.
European Search Report Corresponding to Application No. 16 179 570.3; dated Nov. 29, 2016; 7 Pages.
EP Examination Report for corresponding Application No. 16179570.3-1927, dated Jan. 2, 2018, 6 pages.

* cited by examiner

800
FINE PHASE SHIFTER
DIPLEXER
COARSE PHASE SHIFTER
FINE PHASE SHIFTER
DIPLEXER
COARSE PHASE SHIFTER
Input 1
Input 2

DIPLEXED ANTENNA WITH SEMI-INDEPENDENT TILT

CROSS-REFERENCE TO RELATED APPLICATIONS

This application claims the benefit of U.S. Provisional Patent Application No. 62/077,596, filed on Nov. 10, 2014, and U.S. Provisional Patent Application No. 62/169,782, filed on Jun. 2, 2015, both of which are incorporated herein by reference in their entirety.

BACKGROUND

Various aspects of the present disclosure relate to base station antennas, and, more particularly, to diplexed antennas with semi-independent tilt.

Cellular mobile operators are using more spectrum bands, and increasingly more spectrum within each band, to accommodate increased subscriber traffic, and for the deployment of new radio access technologies. Consequently, there is great demand for diplexed antennas that cover multiple closely-spaced bands (e.g., 790-862 MHz and 880-960 MHz). Based on network coverage requirements, operators often need to adjust the vertical radiation pattern of the antennas, i.e., the pattern's cross-section in the vertical plane. When required, alteration of the vertical angle of the antenna's main beam, also known as the "tilt", is used to adjust the coverage area of the antenna. Adjusting the beam angle of tilt may be implemented both mechanically and electrically. Mechanical tilt may be provided by angling the diplexed antenna physically downward, whereas electrical tilt may be provided by controlling phases of radiating signals of each radiating element so the main beam is moved downward. Mechanical and electrical tilt may be adjusted either individually, or in combination, utilizing remote control capabilities.

Network performance may be optimized if the tilt (e.g., electrical tilt) associated with each frequency band supported by an antenna is completely independently controlled. However, this independence may require a large number of diplexers and other components, adding significant cost and complexity to the creation of a diplexed antenna.

Accordingly, it would be advantageous to have a low complexity, cost-effective diplexed antenna able to produce high quality radiation patterns for each of the supported frequency bands.

SUMMARY OF THE DISCLOSURE

Various aspects of the present disclosure may be directed to a diplexed antenna for processing two or more frequency bands, in which the vertical tilt of each of the supported frequency bands may be separately controlled by a coarse level of phase shifting, but commonly controlled by a fine level of phase shifting. In one aspect, a diplexed antenna may comprise a first radio frequency (RF) input configured to provide a first RF signal associated with a first frequency band, and a second RF input for providing a second RF signal associated with a second frequency band. The diplexed antenna may also include at least one first coarse phase shifter coupled to the first RF input, and at least one second coarse phase shifter coupled to the second RF input. First and second diplexers may be coupled to the at least one first and second coarse phase shifters. At least one first fine phase shifter may be coupled to the at least one first diplexer. At least one second fine phase shifter may be coupled to the at least one second diplexer. The at least one first and second fine phase shifters may be configured to provide respective first and second RF outputs to one or more radiating elements.

BRIEF DESCRIPTION OF THE SEVERAL VIEWS OF THE DRAWINGS

The following detailed description will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF VARIOUS EMBODIMENTS

Figure 1:
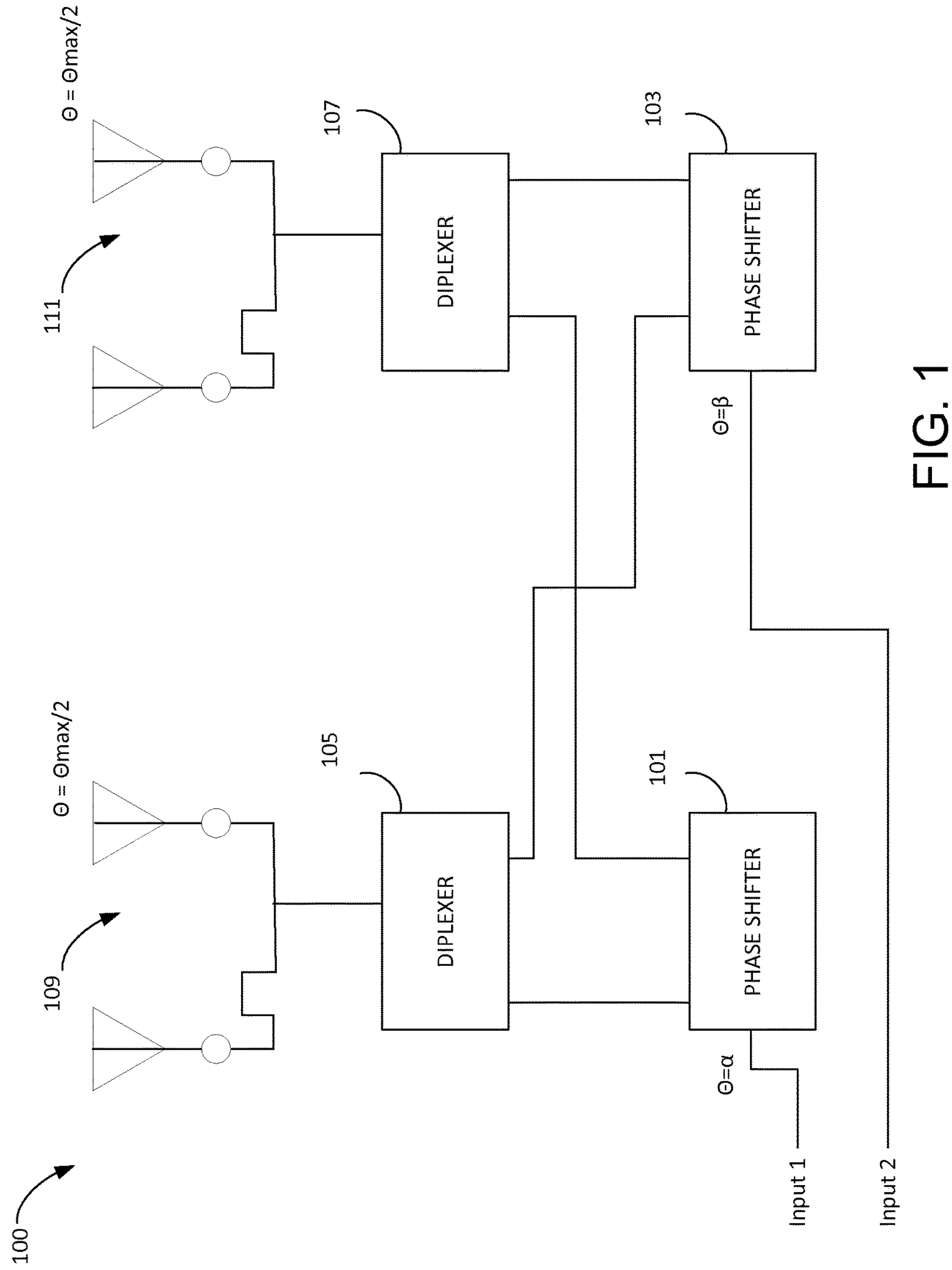
FIG. 1 is a schematic diagram of one example of a diplexed antenna with a simple design.

Certain terminology is used in the following description for convenience only and is not limiting. The words "lower," "bottom," "upper" and "top" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

FIG. 1 is a schematic diagram of an example of a diplexed antenna 100. As shown, the diplexed antenna 100 includes first and second first level phase shifters 101, 103 coupled to inputs of respective diplexers 105, 107. Each output of the respective diplexers 105, 107 may be coupled to sub-arrays of radiating elements 109, 111 resulting in a fixed tilt within the sub-arrays of the radiating elements 109, 111. Employing a small number of diplexers, the diplexed antenna 100 exhibits simplicity and may be relatively inexpensive to implement. Unfortunately, the quality of radiation patterns produced by the diplexed antenna 100 may suffer due to some of the phase offsets being fixed.

Figure 2:
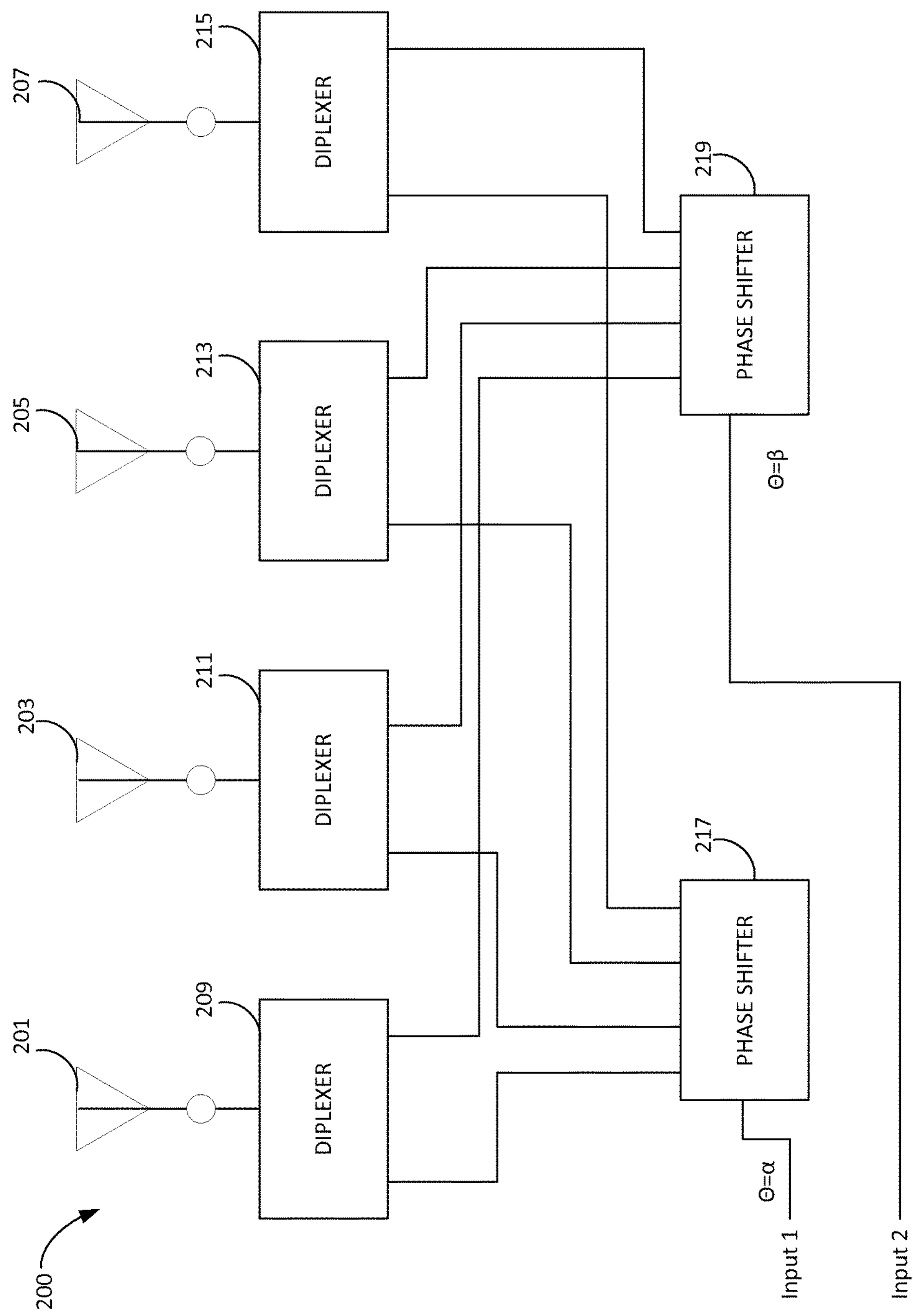
FIG. 2 is a schematic diagram of another example of a diplexed antenna with a more complex design.

Higher quality patterns may be realized when the electrical tilt of each frequency band is completely independently controlled, for example, as shown in a configuration of a four-radiating element diplexed antenna 200 illustrated in FIG. 2. As shown, each radiating element 201, 203, 205, 207 is coupled to a respective diplexer 209, 211, 213, 215, each of which is, in turn, coupled to outputs of each of phase shifters 217, 219. The number of diplexers may double when employing dual polarization functionality. Such diplexed antennas may increase in complexity and cost with greater lengths. For example, diplexed antennas having respective lengths of 1.4, 2.0, and 2.7 meters may require 10, 16, and 20 diplexers respectively, to produce high quality radiation patterns for each of the supported frequency bands.

As evident from the descriptions in connection with FIGS. 1 and 2, for better performance, it may be desirable for diplexed antennas to have an individually controllable tilt for each supported band. While completely individual controllable tilt may be desirable, there may be a significant correlation between (or among) the respective vertical tilt range of each supported band of the diplexed antenna, at least partly due to a frequency band tilt range's dependence on a mount height of the antenna supporting the frequency bands. More specifically, the higher above ground the antenna is mounted, the greater the tilt that may be required for acceptable operation.

Aspects of the present disclosure may take advantage of the above discussed tilt correlation by being directed to a diplexed antenna for processing two or more frequency bands, where the vertical tilt of each of the supported frequency bands may be independently controlled by a coarse level of phase shifting, but commonly controlled by a fine level of phase shifting. As such, aspects of the present disclosure may achieve elevation patterns of a quality similar to that of the diplexed antenna 200 of FIG. 2 above, but at a low cost, light weight, and simplicity similar to that of the diplexed antenna 100 of FIG. 1 above.

Figure 3:
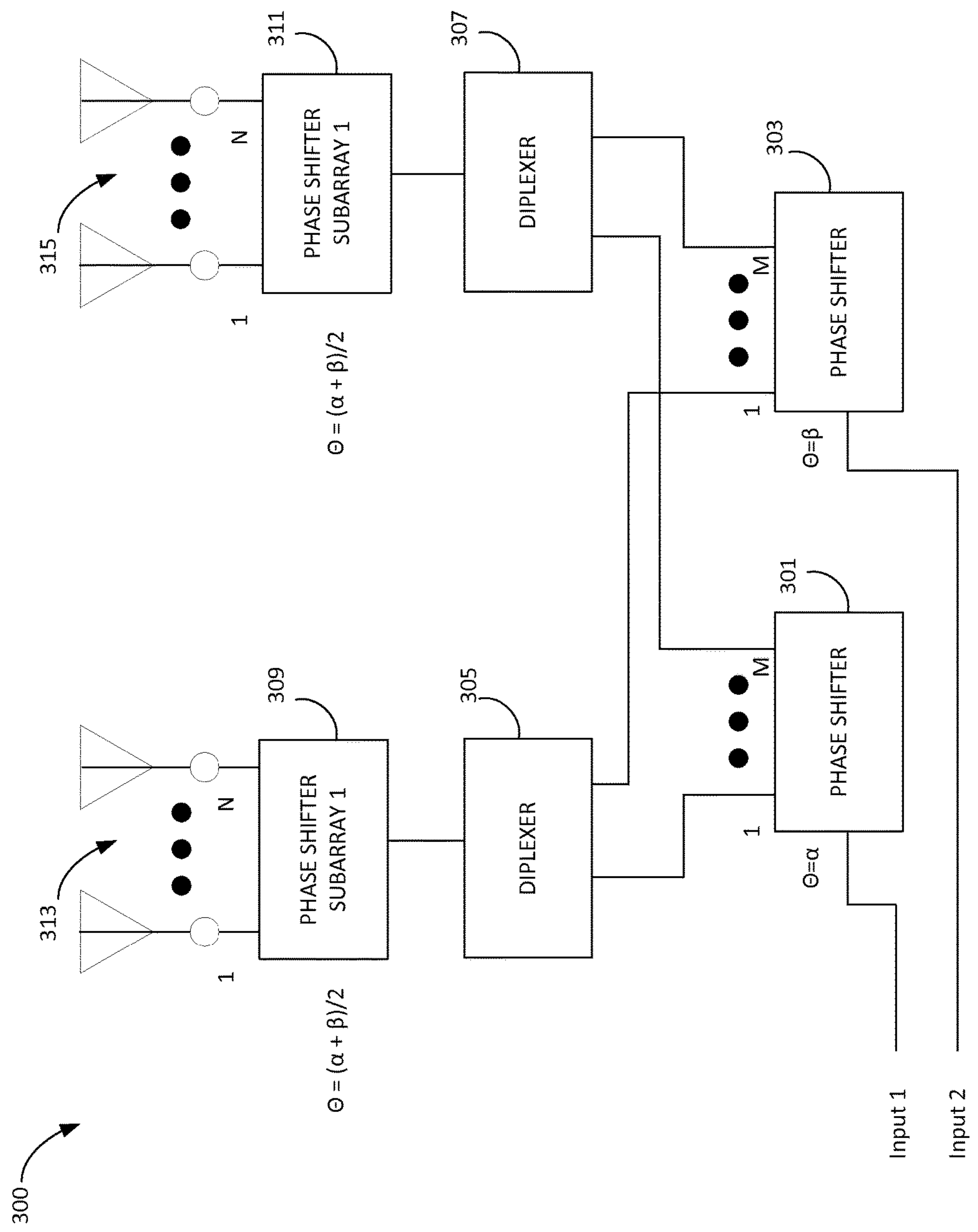
FIG. 3 is a schematic diagram of a further example of a diplexed antenna, according to an aspect of the present disclosure.

Referring now to FIG. 3, according to an aspect of the present disclosure, a diplexed antenna 300 may include first and second coarse phase shifters 301, 303, first and second diplexers 305, 307, first and second fine phase shifters 309, 311, and radiating elements 313, 315. As discussed herein, each of the radiating elements may refer to single radiating elements or a sub-array of multiple radiating elements. The first coarse phase shifter 301 may be set to a tilt value $\alpha$, which may provide a first contribution on a first tilt associated with a first frequency band, while the second coarse phase shifter 311 may be set to a tilt value $\beta$, which may provide a second contribution on a second tilt associated with a second frequency band. For example, the first coarse phase shifter 301 may be configured to receive an RF signal of the first frequency band (e.g., 790-862 MHz), and divide the RF signal into varied phase signals based on the set tilt value $\alpha$. For example, one of the varied phase signals may have a first phase, and another of the varied phase signals may have a second phase different from the first phase. The second coarse phase shifter 311 may be configured to receive an RF signal of the second frequency band (e.g., 880-962 MHz), and divide the RF signal into varied phase signals in a similar fashion to that of the first coarse phase shifter 301.

The diplexers 305, 307 may be configured to diplex the varied phase signals output from the coarse phase shifters 301, 311. For example, the diplexer 305 may be configured to receive one or more varied phase signals output from the first coarse phase shifter 301, as well as one or more varied phase signals output from the second coarse phase shifter 303. Outputs from each of the diplexers 305, 307 may direct communication signals according to the first and second frequency bands.

An output from each of the first and second diplexers 305, 307 may be coupled to inputs of first and second fine phase shifters 309, 311 respectively. The first and second fine phase shifters 309, 311 may be configured to provide phase shifting among the radiating elements 313, 315. The first and second fine phase shifters 309, 311 may allow for operation on all of the supported frequency bands of the diplexed antenna with equal effect. More specifically, the first and second fine phase shifters 309, 311 may be configured to provide a phase shift based on the average of the set tilt values $\alpha°$ and $\beta°$ of the supported frequency bands, or $(\alpha°+\beta°)/2$. To aid in the suppression of sidelobes of produced radiation patterns, each of the coarse and fine phase shifters may include a power divider (such as, for example, a Wilkinson power divider, not shown) to effect a tapered amplitude distribution (e.g., a linear phase progression) across the radiating elements 313, 315.

Figure 4:
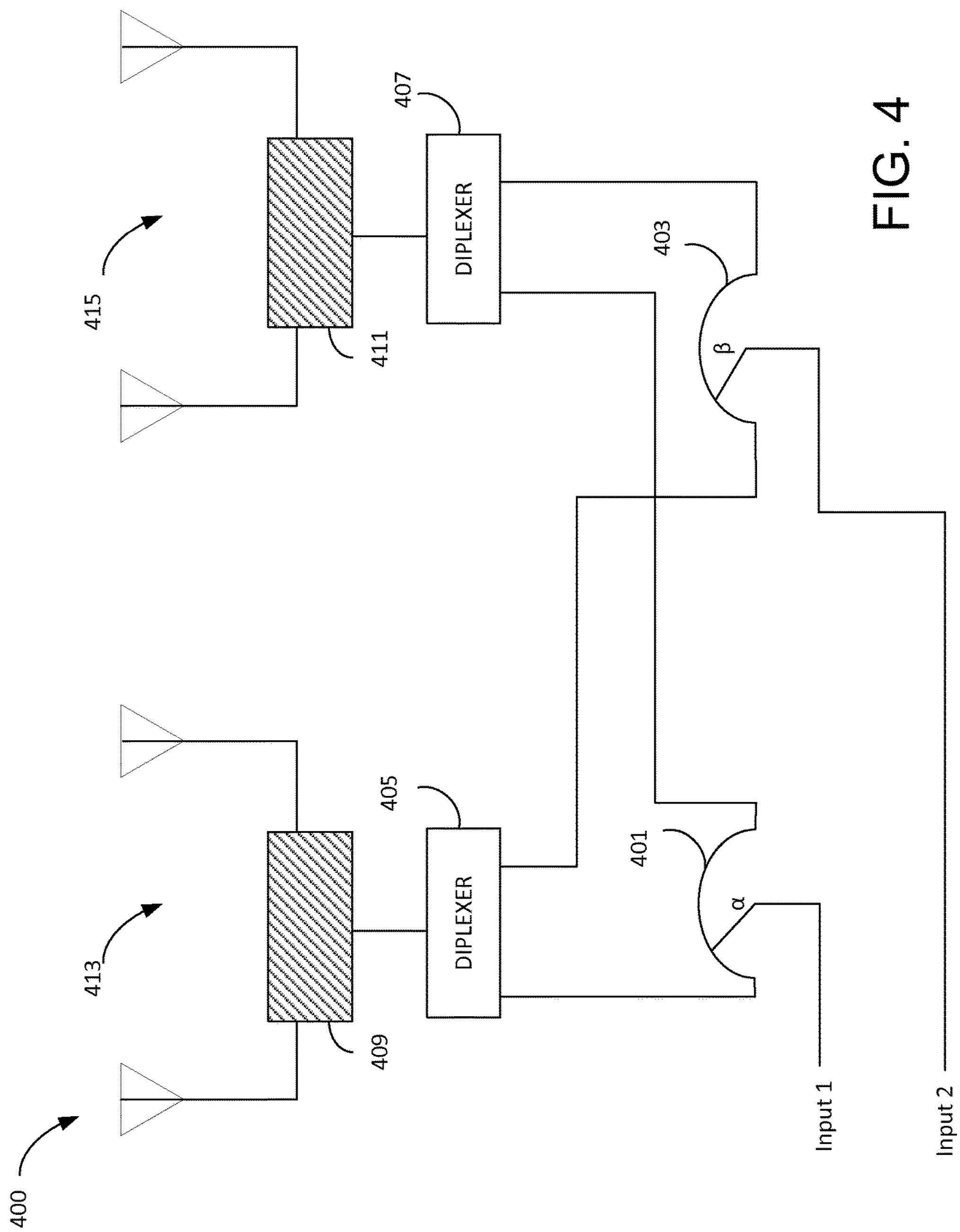
FIG. 4 is a schematic diagram of a diplexed antenna using wiper arc and sliding dielectric phase shifters, according to an aspect of the present disclosure.

Referring now to FIG. 4, the first and second coarse phase shifters 401, 403 of a diplexed antenna 400, for example, may take the form of wiper-arc phase shifters, such as described in U.S. Pat. No. 7,463,190, the contents of which are incorporated herein in their entirety. Wiper-arc phase shifters may be preferred for coarse phase shifting due at least in part to their ability to generate a large phase shift in a small amount of area. The first and second fine phase shifters 409, 413 may take the form of sliding dielectric phase shifters as known in the art, employing a linkage attached to both of the coarse phase shifters 401, 403 to effect a tilt value of $(\alpha°+\beta°)/2$, as discussed above. Sliding dielectric phase shifters may be preferred for fine phase shifting due, at least in part, to their ease of allowance of differing power levels across respective outputs, which may be conducive to implementing a taper across an aperture of the diplexed antenna. Other types of phase shifters as known in the art may be employed in keeping with the spirit of the disclosure. Similar to the diplexed antenna 400, according to aspects of the present disclosure, to aid in the suppression of sidelobes of produced radiation patterns, each of the coarse and fine phase shifters may include a power divider (such as, for example, a Wilkinson power divider, not shown) to effect a tapered amplitude distribution across sub-arrays of radiating elements 413, 415.

Figure 5A:
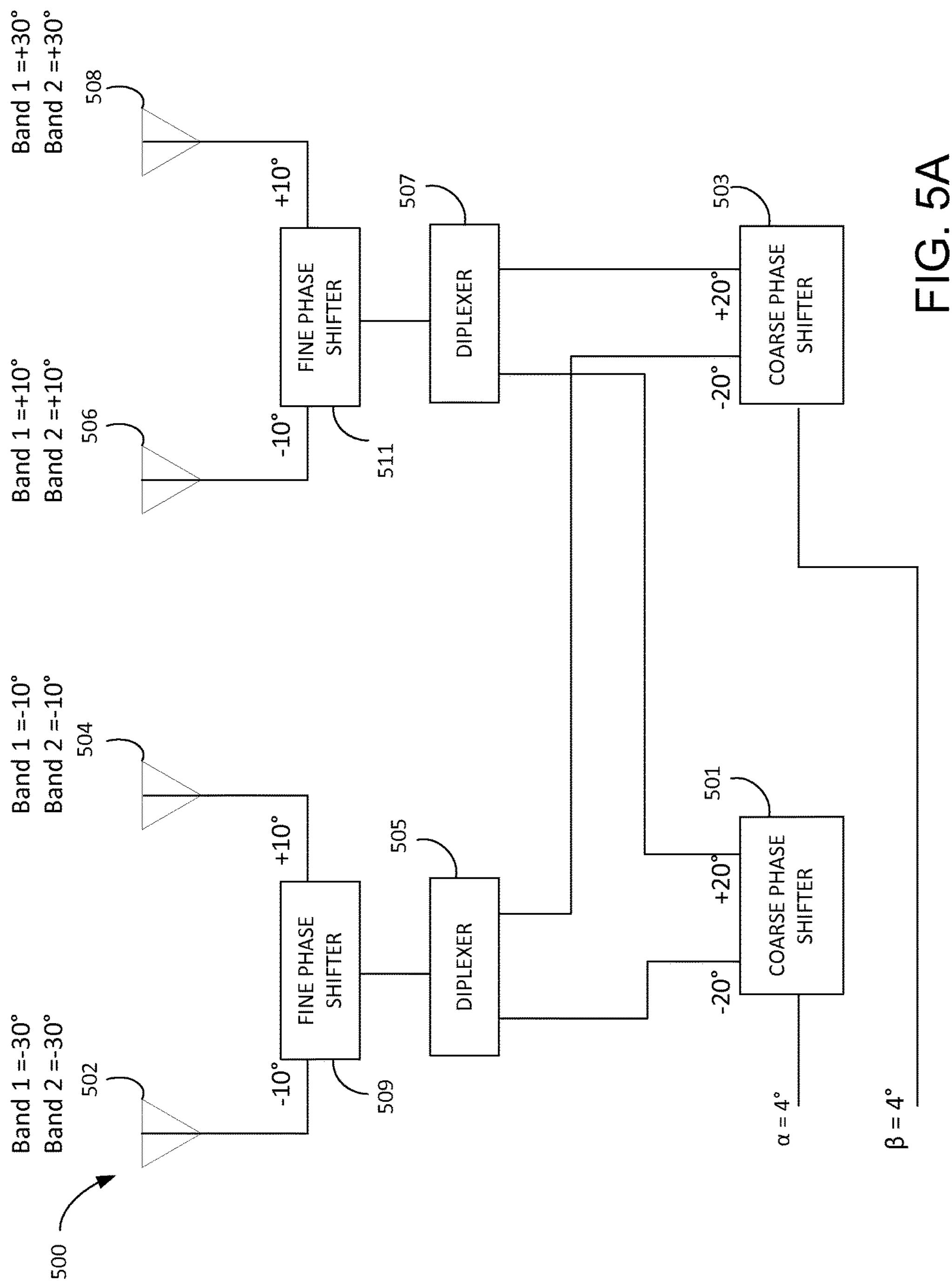
FIG. 5A is a schematic diagram of an example of a diplexed antenna having a length of 1.0 meters, with the first and second frequency bands having the same desired downtilt of 4°, according to an aspect of the present disclosure.
Figure 5B:
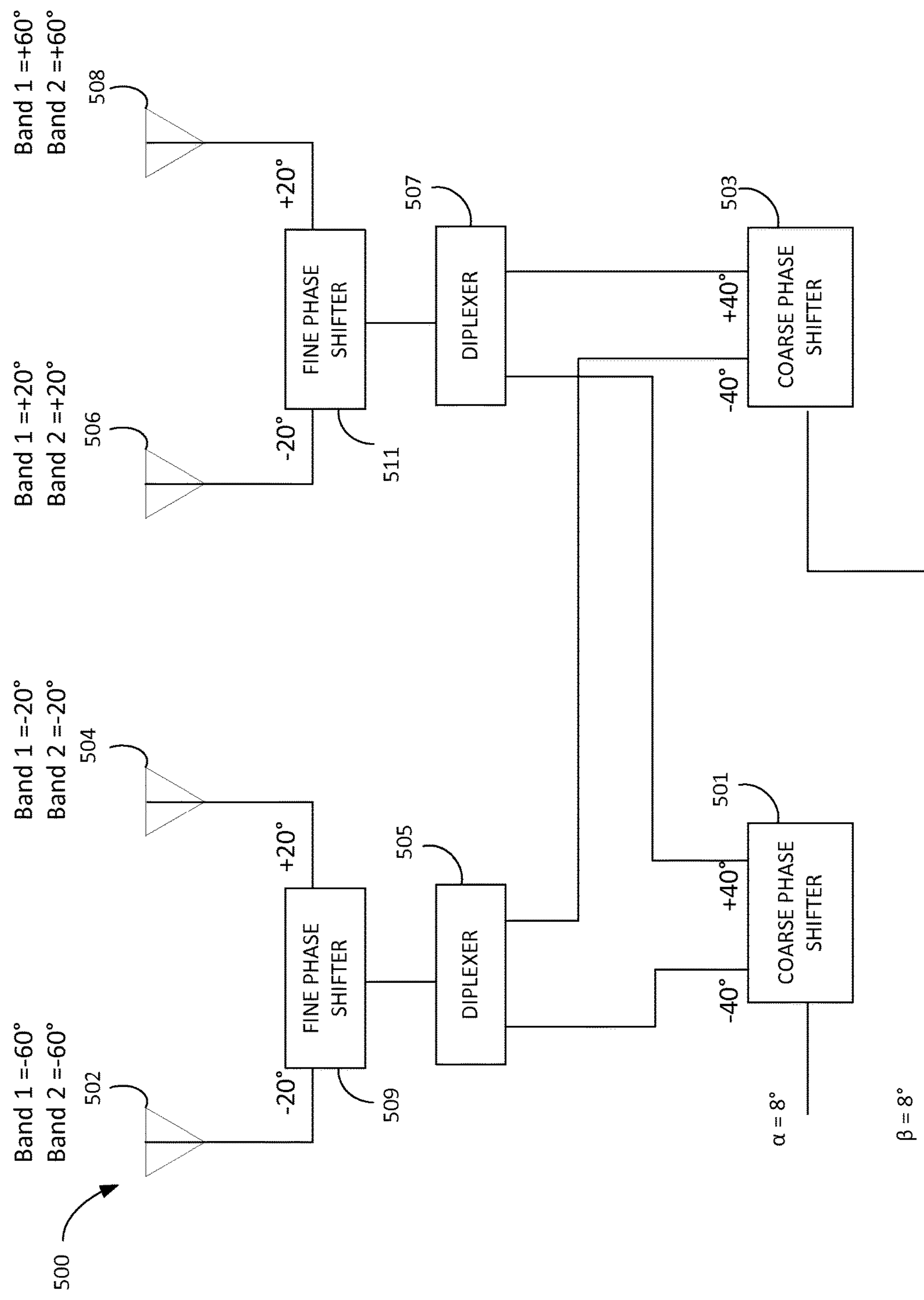
FIG. 5B is a schematic diagram of an example of a diplexed antenna having a length of 1.0 meters, with the first and second frequency bands having the same desired downtilt of 8°, according to an aspect of the present disclosure.
Figure 5C:
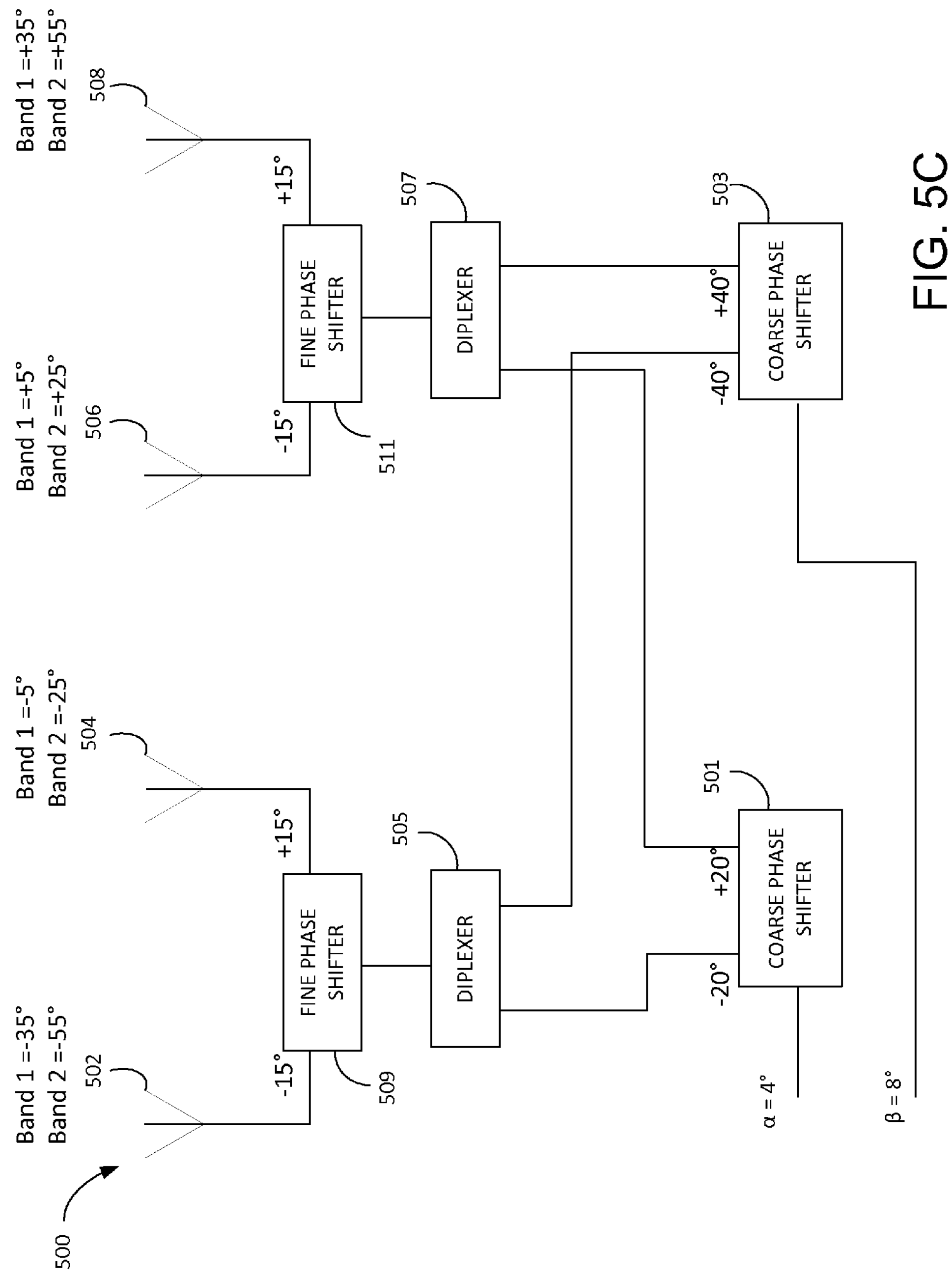
FIG. 5C is a schematic diagram of an example of a diplexed antenna having a length of 1.0 meters, with the first frequency band having a desired downtilt of 4° and the second frequency band having a desired downtilt of 8°, according to an aspect of the present disclosure.

Aspects of the present disclosure may be directed to various antenna lengths, which may incorporate the use of additional components (e.g., diplexers and phase shifters with additional outputs). For example, FIGS. 5A-5C are examples of diplexed antennas 500. As shown, the diplexed antenna 500 may comprise first and second coarse phase shifters 501, 503, first and second diplexers 505, 507, first and second fine phase shifters 509, 511, and radiating elements 502, 504, 506, 508.

The first coarse phase shifter 501 may be set to tilt value $\alpha$, which may provide a first contribution on a first tilt associated with a first frequency band, while the second coarse phase shifter 503 may be set to tilt value $\beta$, which may provide a second contribution on a second tilt associated with a second frequency band. For example, the first coarse phase shifter 501 may be configured to receive an RF signal of the first frequency band and divide the RF signal into varied phase signals based on the set tilt value $\alpha$. For example, one of the variable phase signals may have a first phase, and another of the variable phase signals may have a second phase different from the first phase. The second coarse phase shifter 503 may be configured to receive an RF signal of the second frequency band, and may divide the RF signal into varied phase signals in a similar fashion to that of the first coarse phase shifter 501.

The diplexers 505, 507 may be configured to diplex the varied phase shifted signals output from the coarse phase shifters 501, 503. For example, the diplexer 505 may be configured to receive one or more varied phase signals output from the first coarse phase shifter 501, as well as one or more varied phase signals output from the second coarse phase shifter 503.

Outputs from each of the diplexers 505, 507 may direct communication signals responsive to the first and second frequency bands. An output of each of the first and second diplexers 505, 507 may be coupled to inputs of first and second fine phase shifters 509, 511 respectively. The first and second fine phase shifters 509, 511 may be configured to provide phase shifting among radiating elements 502, 504, 506, 508. The first and second fine phase shifters 509, 511 may allow for operation on all of the supported frequency bands of the diplexed antenna with equal effect. More specifically, the first and second fine phase shifters 509, 511 may be configured to provide a phase shift based on a combination of the set tilt values $\alpha$ and $\beta$ of the respective coarse phase shifters 501, 503. This combination, may, for example, include an average of the set tilt values $\alpha°$ and $\beta°$ of the supported frequency bands, or $(\alpha°+\beta°)/2$. To aid in the suppression of sidelobes of produced radiation patterns, each of the coarse phase shifters 501, 503 and fine phase shifters 509, 511 may include a power divider (such as, for example, a Wilkinson power divider, not shown) to effect a tapered amplitude distribution across the radiating elements 502, 504, 506, 508.

According to aspects of the present disclosure, a tilt value $\Theta$ may be related to a phase shift generated by each of the phase shifters. For example, phase shift=$\sin(\Theta)*S*k$, where S=a distance between radiating elements in degrees (wavelength=360°), and k=distance between phase shifter outputs measured in element spacings. For small values of downtilt, $\sin(\Theta)*S \approx \Theta*\sin(1)*S \approx 0.0175*\Theta*S$.

In the configurations illustrated in FIGS. 5A-5C, each coarse phase shifter 501, 503 may include outputs that are two element spacings apart (i.e., k=2). For example, according to the diplexed antenna 500 in FIGS. 5A-5C, each coarse phase shifter 501, 503 may shift every 2 radiating elements. Each fine phase shifter 509, 511 may include outputs that are one element spacing apart (i.e., k=1). For example, according to the diplexed antenna 500 in FIGS. 5A-5C, each fine phase shifter 509, 511 may shift every radiating element. The distance between radiating elements, S, may typically be between 250°-300°. However, S may be other values outside this range in keeping with the invention. With a value of S in the range of 250°-300°, $\sin(1)*S \approx 5°$. It should be noted that each of the coarse phase shifters 501, 503 may include outputs that may be fewer or greater than two element spacings apart in keeping with the disclosure. Further, it should be noted that each of the fine phase shifters 509, 511 may include outputs that are greater than one element spacing apart in keeping with the disclosure. It should also be noted that, particularly with other configurations (e.g., diplexed antenna 600, 700, 800, 900, 1000, and the like), other coarse and fine phase shifters may include outputs that are any number of element spacings apart in keeping with the spirit of the disclosure.

Referring to FIG. 5A, when the set tilt value for each frequency band is equal (e.g., $\alpha=\beta=4°$), the diplexed antenna may exhibit accuracy similar to that of each of the supported bands having completely independent tilt. Therefore, using the above equation, the phase shift generated by the first coarse phase shifter 501=$\alpha*\sin(1)*S*k=4*5*2=40°$. Therefore, the first coarse phase shifter 501 may generate a pair of varied phase signals varied by 40° in phase. This variation in phase shift may be realized by having one of the outputs of the first coarse phase shifter 501 having a phase of −20° and the other having a phase of +20°. However, it should be noted that other phase shifts may be employed in keeping with the disclosure.

With $\alpha=\beta=4°$, the first and second fine phase shifters 509, 511 may be configured to generate a phase shift based on a combination of the set tilt values of the supported bands of the diplexed antenna. For example, the first and second fine phase shifters 509, 511 may be configured to generate a phase shift based on an average of the set tilt values $\alpha=\beta=4°$, which in this case, would be 4°. As such, according to the above equation, the phase shift generated by each of the first and second fine phase shifters 509, 511 may be 20°, which may result in a phase progression across the outputs of each of first and second fine phase shifter outputs 509, 511, of 10° and +10°. Table 1 below provides a list of phase shifts applied to each radiating element 502, 504, 506, 508 as attributed to each phase shifter, and the total phase shift applied to each radiating element 502, 504, 506, 508, with such a configuration.

TABLE 1

| $\alpha = \beta = 4°$ | | | | |
|---|---|---|---|---|
| Radiating Element # | 502 | 504 | 506 | 508 |
| Coarse phase shifters 501, 503 | −20° | −20° | +20° | +20° |
| Fine phase shifters 505, 507 | −10° | +10° | −10° | +10° |
| Total phase shift | −30° | −10° | +10° | +30° |

Alternatively, as shown in FIG. 5B, if $\alpha=\beta=8°$, the phase shift generated by the first and second coarse phase shifters 501, 503=α*sin(1)*S*k=8*5*2=80°. Therefore, each of the first and second coarse phase shifters 501, 503 may generate a phase shift of 80°. For example, the output signals of the first and second coarse phase shifters 501, 503 may have a phase −40° and +40° respectively. However, it should be noted that other phase shifts may be employed in keeping with the disclosure. The first and second fine phase shifters 509, 511 may be configured to generate a phase shift based on the average of the set tilt values α and β, which would, in this case, be 8°. As such, according to the above equation, the phase shift generated by each of the first and second fine phase shifters 509, 511 may be 40°, which may be realized with one of the output signals having a phase of −20° and the other of the output signals having a phase of +20°. Table 2 below lists phase shifts applied to each radiating element 502, 504, 506, 508 as attributed to each phase shifter, and the total phase shift applied to each radiating element 502, 504, 506, 508:

TABLE 2

| $\alpha = \beta = 8°$ | | | | |
|---|---|---|---|---|
| Radiating Element # | 502 | 504 | 506 | 508 |
| Coarse phase shifters 501, 503 | −40° | −40° | +40° | +40° |
| Fine phase shifters 505, 507 | −20° | +20° | −20° | +20° |
| Total phase shift | −60° | −20° | +20° | +60° |

As shown in FIG. 5C, according to aspects of the present disclosure, when the desired tilts for the supported bands differ, performance may only slightly degrade, but may still be acceptable. For example, with the set tilts $\alpha=4°$ and $\beta=8°$, the fine phase shifters 509, 511 for both supported frequency bands may be configured to generate a phase shift based on the average set tilt values, which in this case would be $(\alpha+\beta)/2=6°$. Therefore, according to the above equation, the phase shift generated by each of the first and second fine phase shifters 509, 511 would be 6*5*1, which may result in a phase shift of 30°, which may be realized with a linear phase progression across the outputs of the first and second fine phase shifters 509, 511 of −15° and +15°. Table 3 below lists phase shifts applied to each radiating element 502, 504, 506, 508 as attributed to each phase shifter, and the total phase shift applied to each radiating element 502, 504, 506, 508, for this first band with tilt values $\alpha=4°$ and $\beta=8°$.

TABLE 3

| Phase for band 1: $\alpha = 4°$, $\beta = 8°$ | | | | |
|---|---|---|---|---|
| Radiating Element # | 502 | 504 | 506 | 508 |
| Coarse phase shifters 501, 503 | −20° | −20° | +20° | +20° |
| Fine phase shifters 505, 507 | −15° | +15° | −15° | +15° |
| Total phase shift | −35° | −5° | +5° | +35° |

Table 4 below lists phase shifts applied to each radiating element 502, 504, 506, 508 as attributed to each phase shifter, and the total phase shift applied to each radiating element 502, 504, 506, 508, for the second frequency band with tilt values $\alpha=4°$ and $\beta=8°$.

TABLE 4

| Phase for band 2: $\alpha = 4°$, $\beta = 8°$ | | | | |
|---|---|---|---|---|
| Radiating Element # | 502 | 504 | 506 | 508 |
| Coarse phase shifters 501, 503 | −40° | −40° | +40° | +40° |
| Fine phase shifters 505, 507 | −15° | +15° | −15° | +15° |
| Total phase shift | −55° | −25° | +25° | +55° |

Through analysis of the above data, the total phase shifts of the radiating elements 502, 504, 506, 508 of the dual band implementations of the diplexed antenna listed in Tables 3 and 4 may be relatively close to the ideal (e.g., effectively completely independent tilt implementations, as reflected in Tables 1 and 2) phase shifts of the radiating elements 502, 504, 506, 508. Consequently, aspects of the present disclosure may be able to achieve elevation patterns of a quality similar to that of more complex diplexed antenna.

Figure 6:
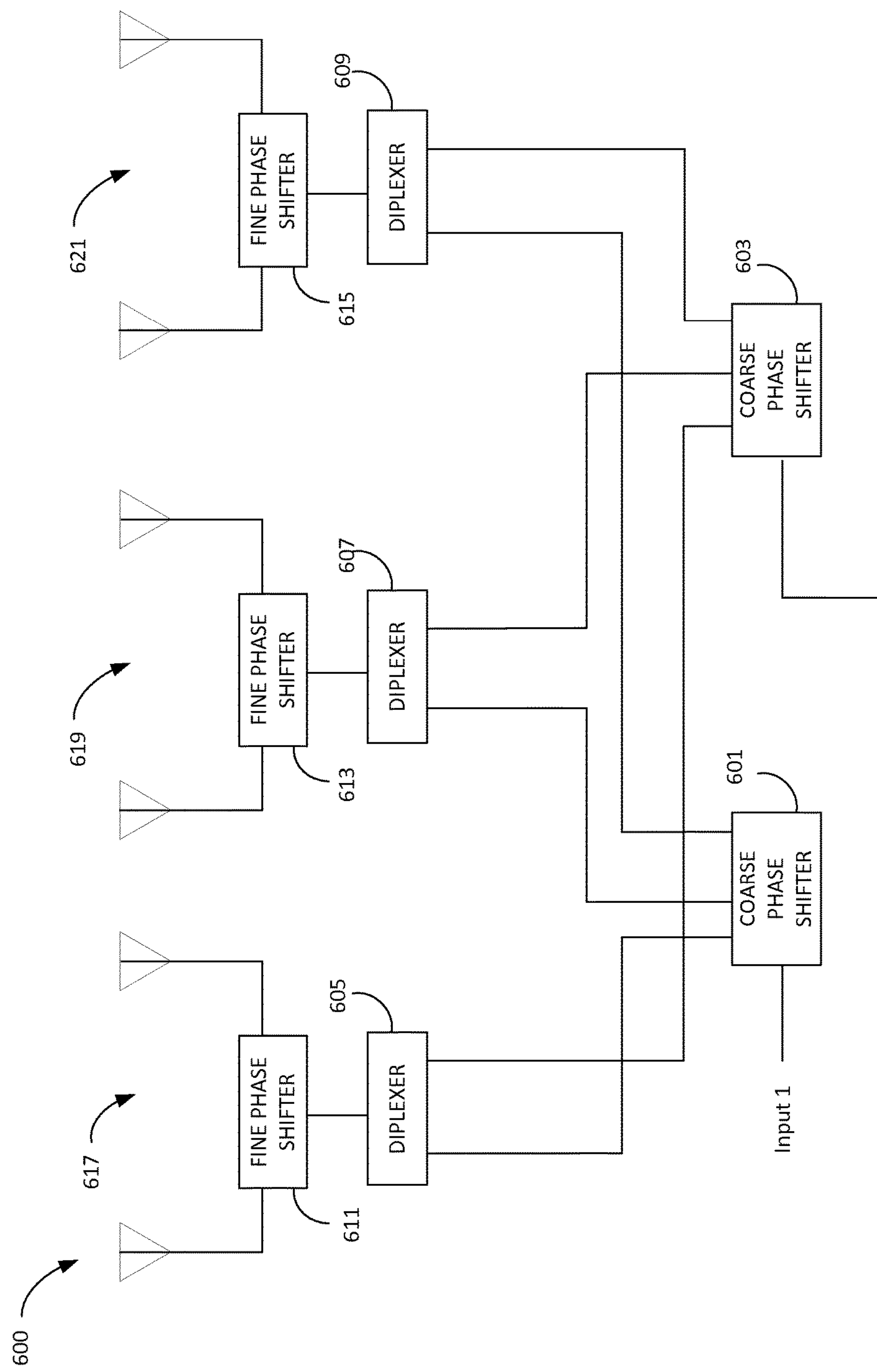
FIG. 6 is a simplified diagram of an example of a diplexed antenna having a length of 1.5 meters, according to an aspect of the present disclosure.

The above equations and relationships may apply to other configurations, as well, in keeping with the spirit of the disclosure. For example, FIG. 6 is a schematic diagram of an example of a diplexed antenna 600 with a length of 1.5 m employing an additional diplexer; coarse phase shifters, each with an additional output; and an additional fine phase shifter, according to an aspect of the present disclosure. The diplexed antenna 600 may comprise first and second coarse phase shifters 601, 603, first, second, and third diplexers 605, 607, 609, first, second, and third fine phase shifters 611, 613, 615, and radiating elements 617, 619, and 621.

Figure 7:
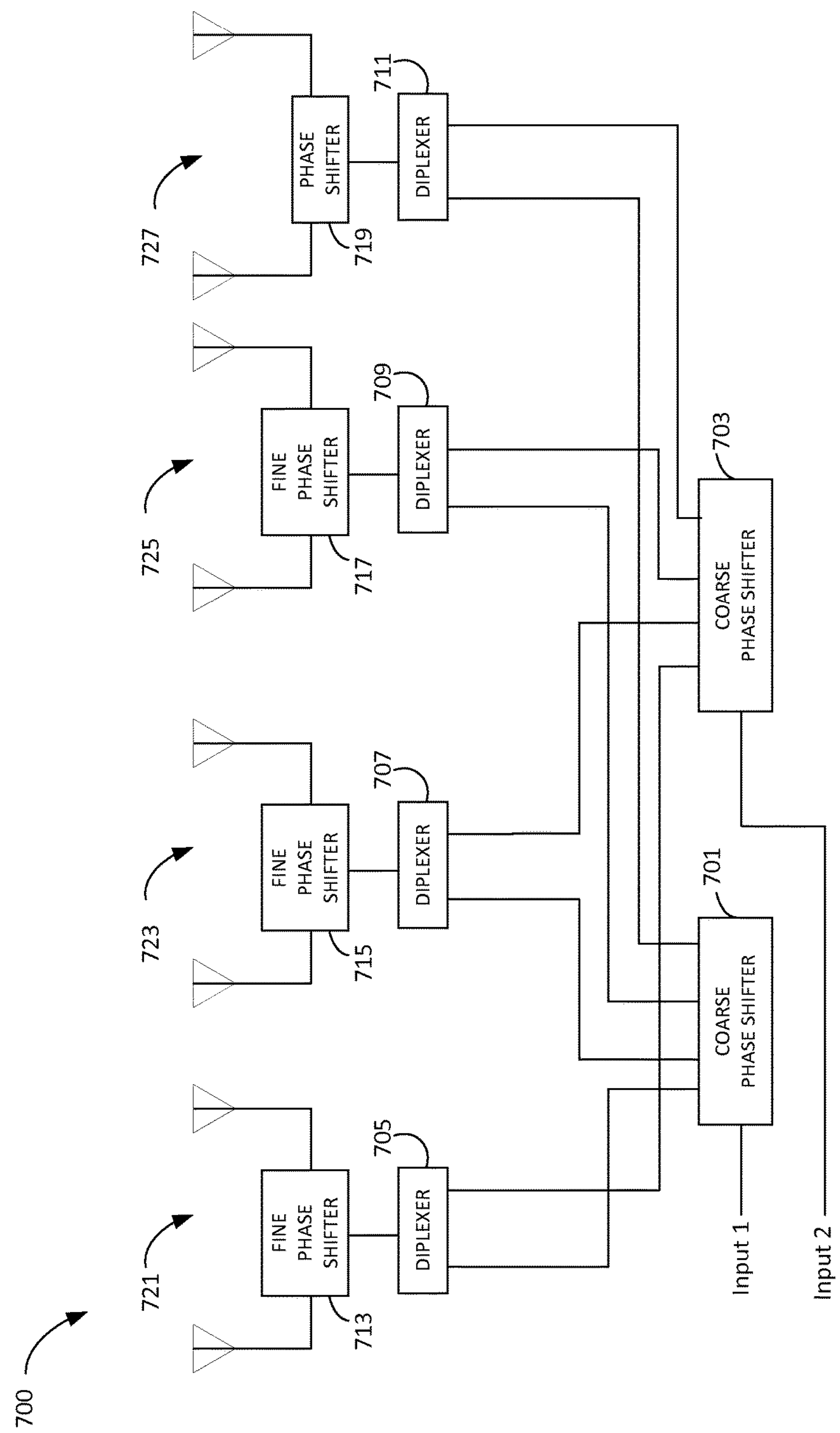
FIG. 7 is a schematic diagram of an example of a diplexed antenna having a length of 2.0 meters, according to an aspect of the present disclosure.

FIG. 7 is a schematic diagram of an example of a diplexed antenna 700 of length of 2.0 m, according to an embodiment of the present disclosure. As shown, the diplexed antenna 700 may comprise first and second coarse phase shifters 701, 703, first, second, third, and fourth diplexers 705, 707, 709, and 711, first, second, and third fine phase shifters 713, 715, 717, and 719, and radiating elements 721, 723, 725, and 727.

Figure 8:
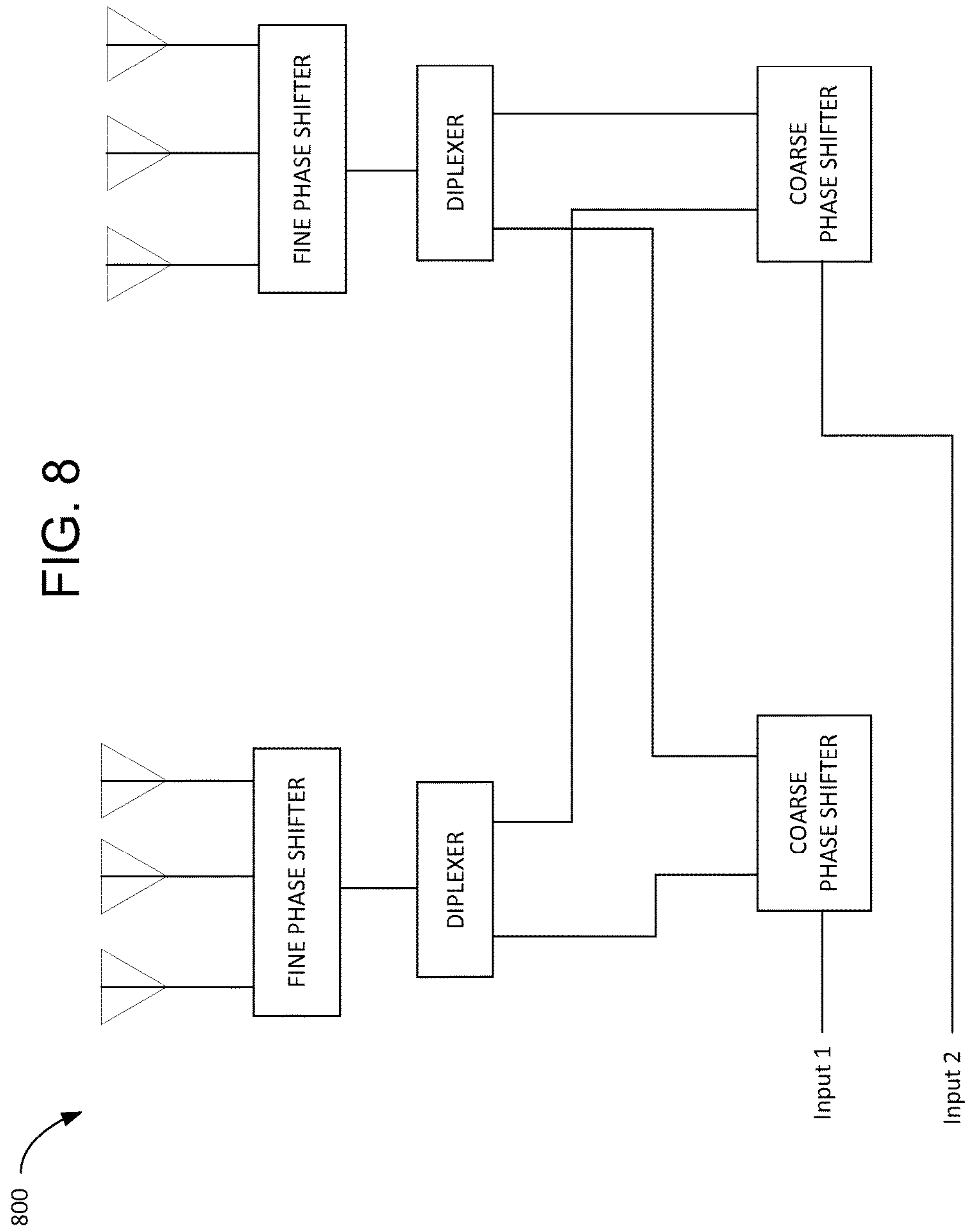
FIG. 8 is a schematic diagram of the diplexed antenna of FIG. 5 with three radiating elements per sub-array, according to an aspect of the present disclosure.
Figure 9:
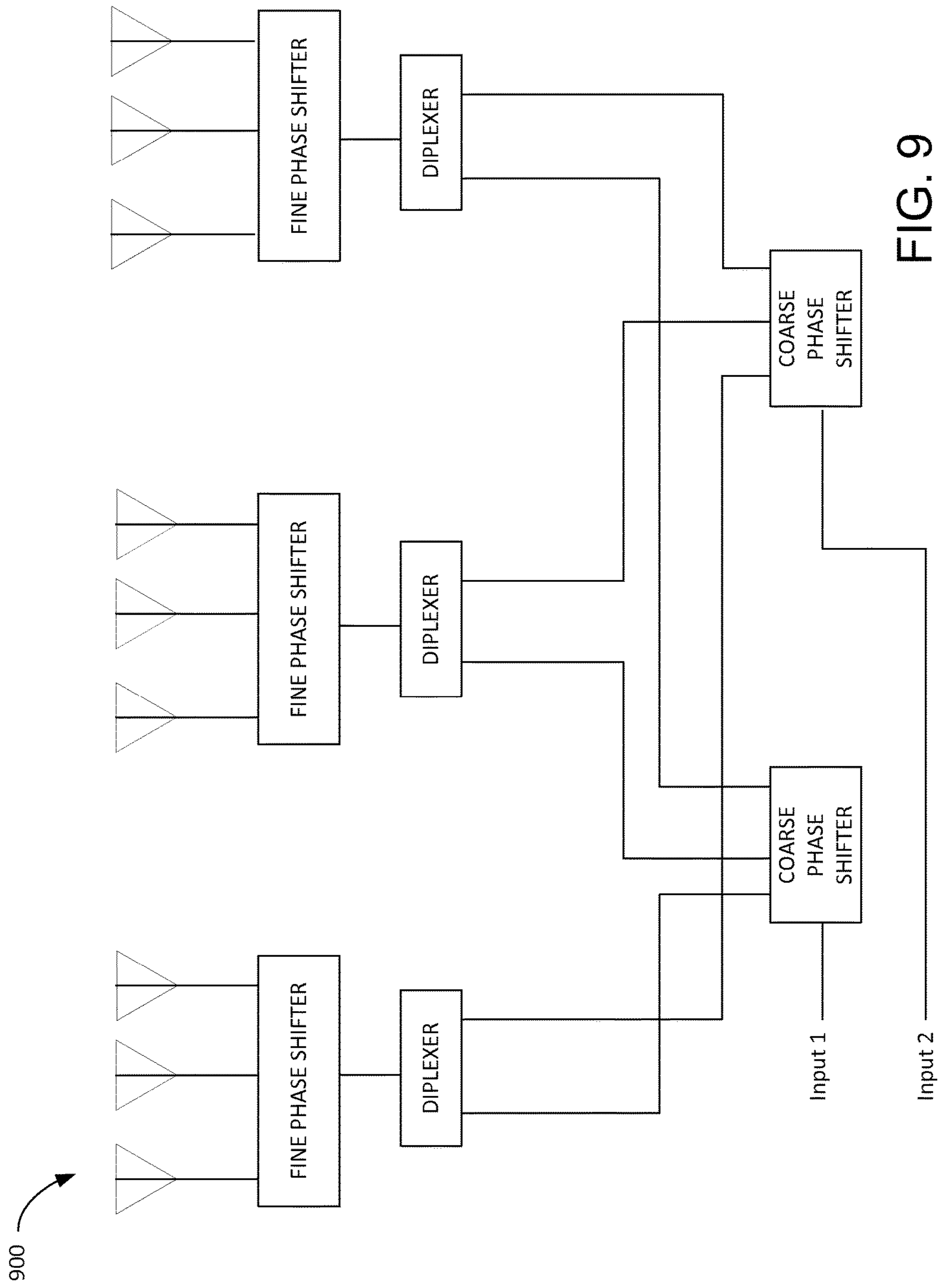
FIG. 9 is a schematic diagram of the diplexed antenna of FIG. 6 with three radiating elements per sub-array, according to an aspect of the present disclosure.
Figure 10:
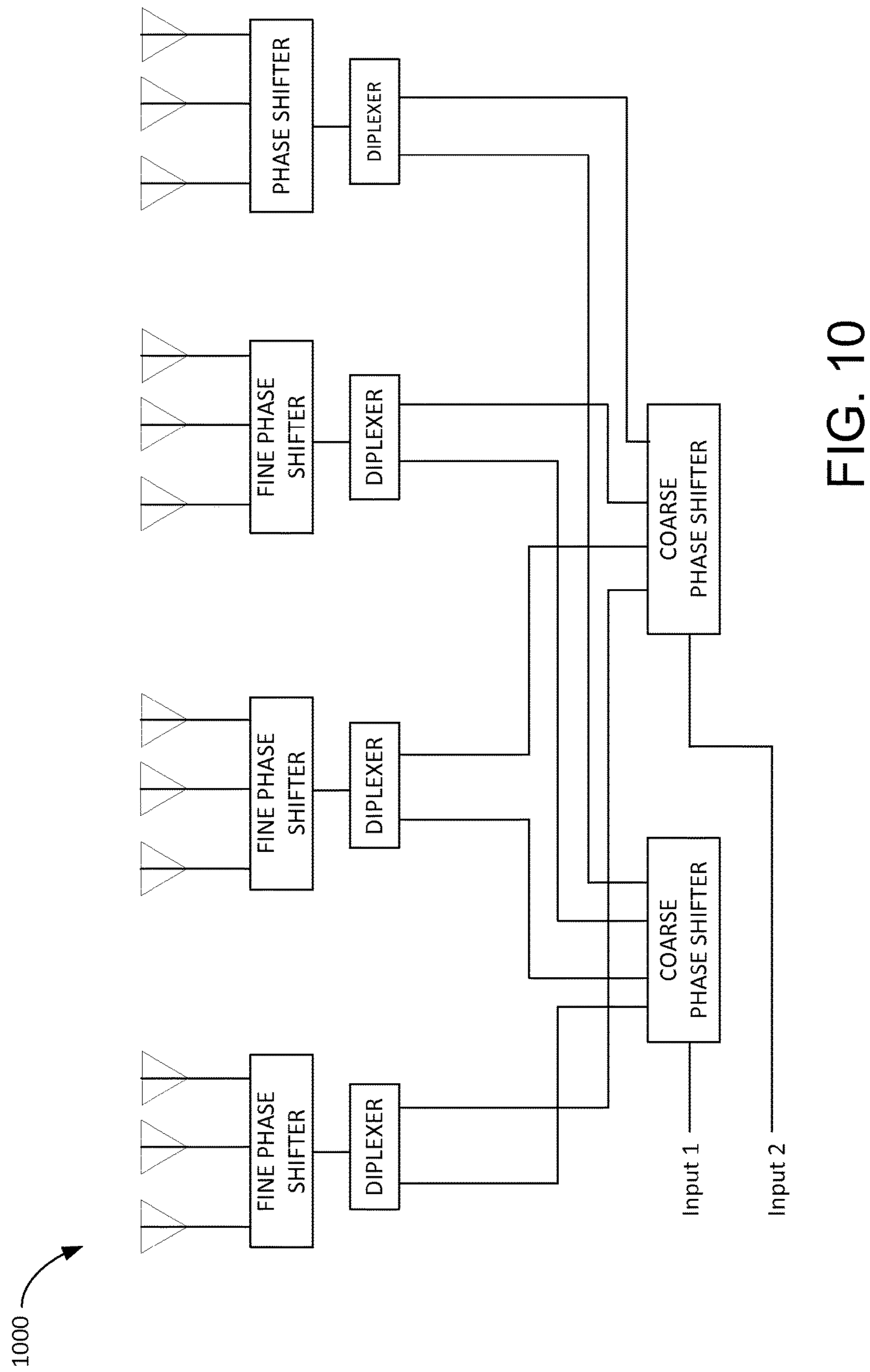
FIG. 10 is a schematic diagram of the diplexed antenna of FIG. 7 with three radiating elements per sub-array, according to an aspect of the present disclosure.

Yet further still, it should be noted that additional components and outputs may be implemented in still keeping with the spirit of embodiments of the disclosure. For example, there could be more than four outputs from each of the first and second coarse phase shifters, coupled to each of the diplexers. Even though the above discussed diplexed antennas may have varying lengths and varying numbers of components (e.g., phase shifters, diplexers, radiating elements, and the like), the general operation may generally be similar to that of the diplexed antenna described in connection with FIG. 3. For example, fine phase shifters may be configured to generate a tilt value of the average of the desired antenna tilts as set by the independent coarse phase shifters of the supported frequency bands. Further, according to aspects of the present disclosure, depending, at least in part, on the antenna length, each sub-array of the diplexed antenna may have fewer and/or greater than two radiating elements. Accordingly, examples of sub-arrays having additional radiating elements are shown in schematic diagrams of each of the diplexed antenna 800 of length 1.4 m, diplexed antenna 900 of length 2.0 m, and diplexed antenna 1000 of length 2.7 m, as depicted in FIGS. 8, 9, and 10, respectively. Although not shown, a sub-array may also consist of only one radiating element.

Aside from the additional radiating elements, the number and configuration of the remaining components shown in each of these figures may be similar to that of the diplexed antennae 500, 600, and 700 of FIGS. 5, 6, and 7, respectively. Further, while the foregoing examples may be illustrated with two sub-bands, additional frequency bands may be added by adding third and fourth (or additional), coarse phase shifters, and triplexers (or greater band multiplexing units), in still keeping with the spirit of aspects of this disclosure.

Although not reflected in the above figures, each of the sub-arrays may have a different number of radiating elements. For example, according to aspects of the disclosure, a diplexed antenna may include one diplexer coupled to a sub-array including three radiating elements, while another diplexer coupled to another sub-array that has one, two, four, or more elements. As another example, aspects of the present disclosure may include a diplexed antenna with a combination of two-element and three-element sub-arrays.

Figure 11:
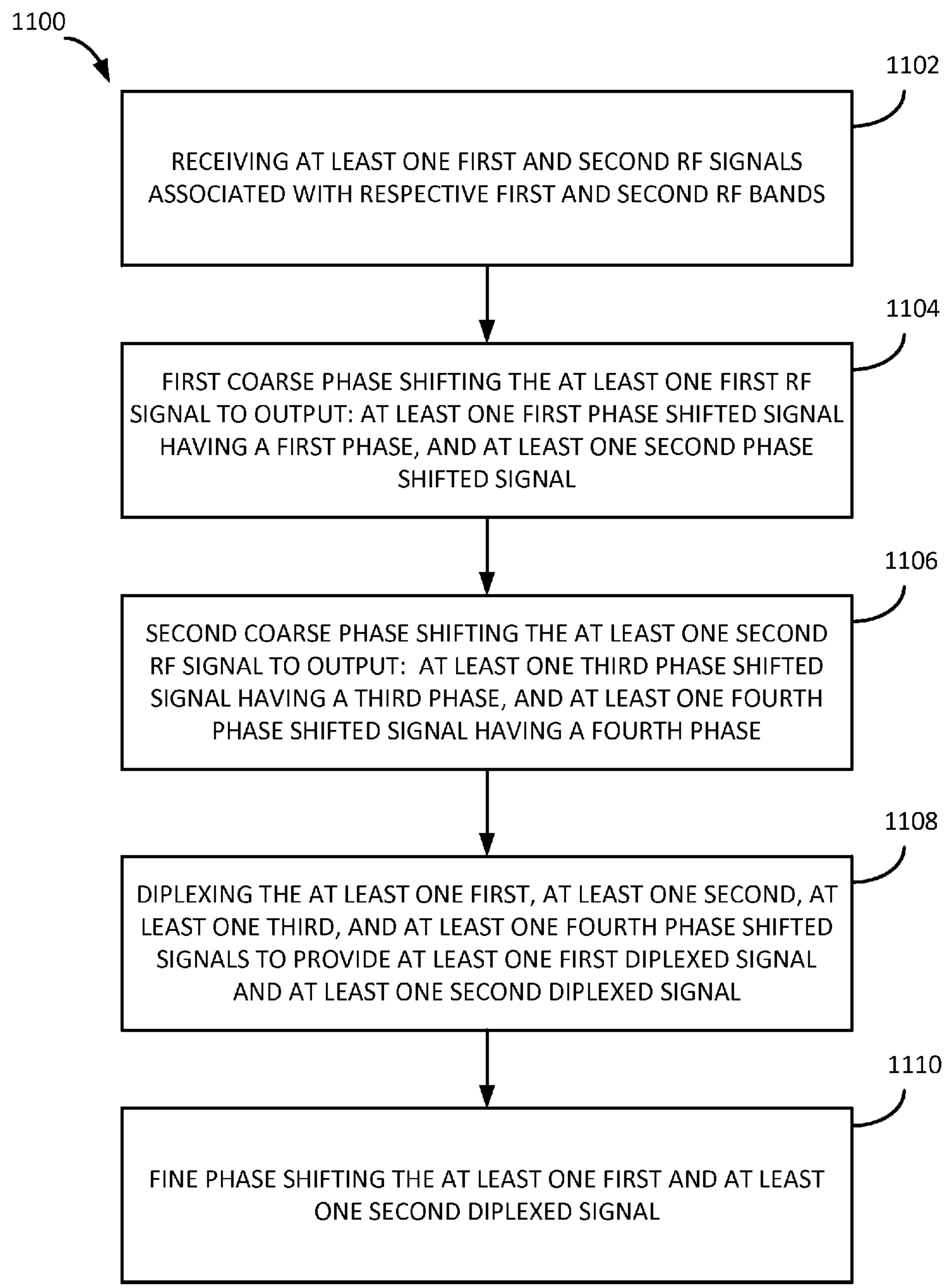
FIG. 11 is a flow chart illustrating an example of a method for operating a diplexed antenna including a first frequency band and a second frequency band, according to an aspect of the present disclosure.

FIG. 11 is a flow chart illustrating a method 1100 for operating a diplexed antenna including a first frequency band and a second frequency band. The method may comprise a number of steps, which may be performed in any suitable order. First and second RF signals, associated with the first and second frequency bands, respectively, may be received, for example, by first and second coarse phase shifters (Block 1102). Outputs may be generated (e.g., from the first coarse phase shifter) which may include a first phase shifted signal having a first phase, and a second phase shifted signal having a second phase different from the first phase (Block 1104). These outputs may result in a first contribution on a first tilt associated with the first RF signal. Other outputs may be generated (e.g., from the second coarse phase shifter), which may include a third phase shifted signal having a third phase, and a fourth phase shifted signal having a fourth phase different from the third phase (Block 1106). These outputs may result in a second contribution on a second tilt associated with the second RF signal. The first, second, third, and fourth phase shifted signals may be diplexed to provide a first diplexed signal and a second diplexed signal (Block 1108). The first and second diplexed signals may then be fine phase shifted (Block 1110). This fine phase shifting may result in a third contribution on both the first and second tilts.

Figure 12A:
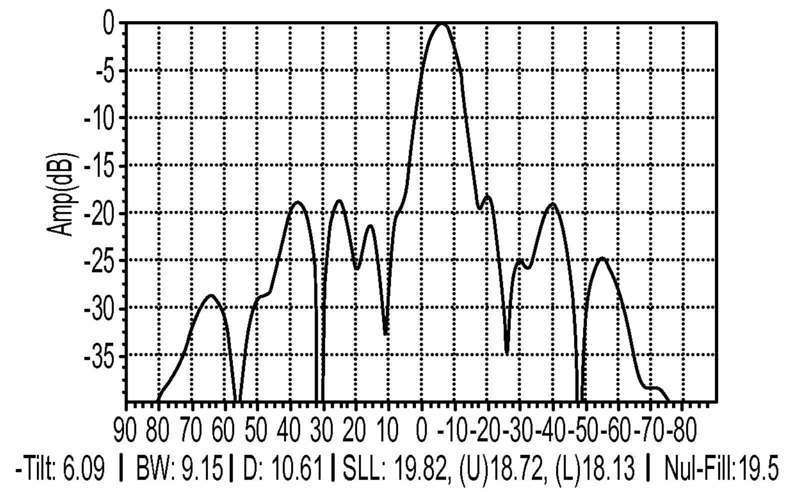
FIGS. 12A, B, and C are example azimuth and elevation plane plots of radiation patterns of one band of a diplexed antenna for a tilt setting of a first band equal to 6° and various second band tilt settings, according to an aspect of the present disclosure.
Figure 12B:
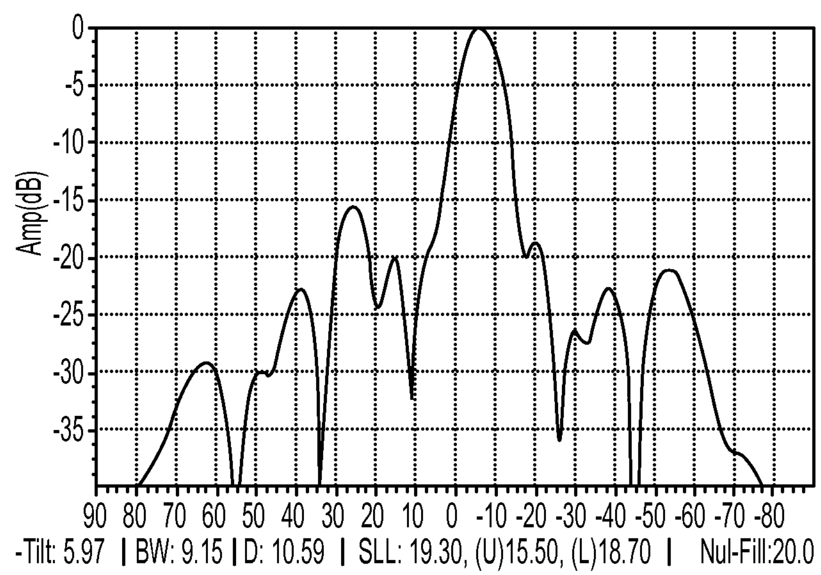
Figure 12C:
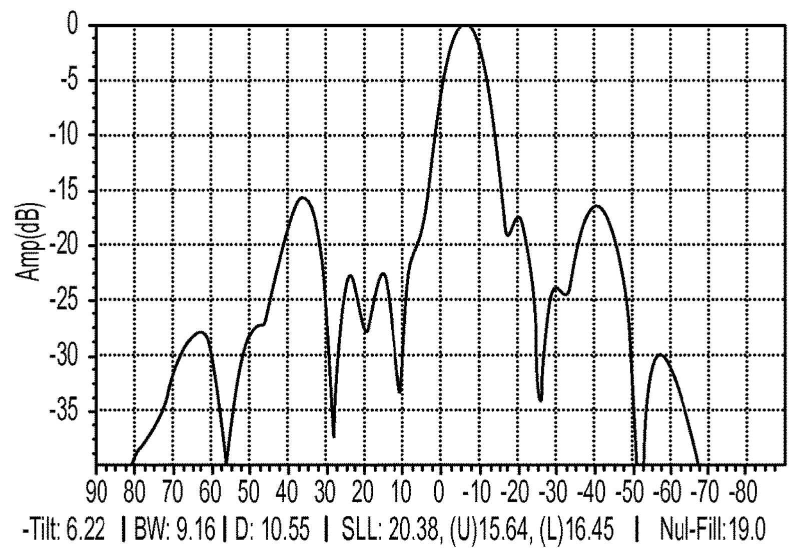

Data collected in testing of an example diplexed antenna, similar to the diplexed antenna 300 illustrated in FIG. 3 above, will now be discussed with reference to FIGS. 12A, 12B, 12C, and 13. FIGS. 12A, 12B, and 12C respectively illustrate azimuth and elevation plane plots of radiation patterns of one band of a diplexed antenna system 300, in accordance with a tilt setting for a first band ("band 1") of 6°, and varying tilt settings for a second band ("band 2").

As discussed above, the quality of each band's radiation pattern may be higher when the set tilt values, $\alpha$ and $\beta$, of each coarse phase shifter of each frequency band are closer together. As such, the best quality radiation pattern may be exhibited when $\alpha$ and $\beta$ are equal. A plot of such a radiation pattern is shown for a first band in FIG. 12A, where $\alpha$ and $\beta$ are both equal to 6°. As shown, such a setting results in an actual tilt of 6.09 and a tilt error of only 0.09 and excellent side lobe suppression.

FIG. 12B illustrates a plane plot of a radiation pattern of band 1 of the diplexed antenna system 300, with the tilt value for band 2, $\beta$, set to 2°. With this setting, the tilt error is only 0.03°, and an upper side lobe has an amplitude of 16 dB.

Even in a case of $\beta$ being set to 10°, (which would typically be at a higher range of possible tilt settings), the diplexed antenna nonetheless produces radiation patterns of significant quality. This case is illustrated in the plot of FIG. 12C showing upper sidelobes still greater than 15 dB and a tilt error of 0.22°.

Figure 13:
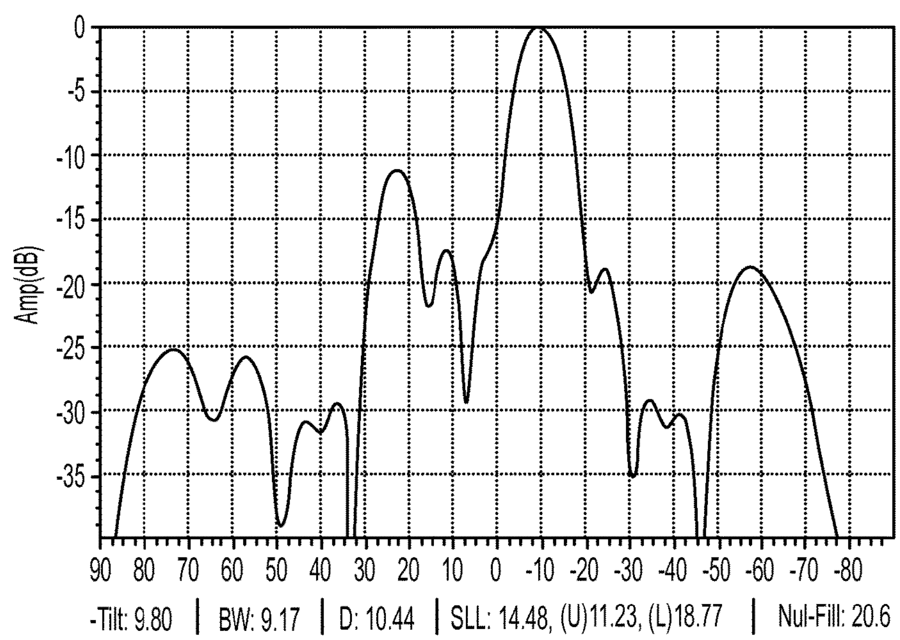
FIG. 13 is an example azimuth and elevation plane plot of a radiation pattern of one band of a diplexed antenna for a tilt setting of a first band equal to 0°, and a second band equal to 10° according to an aspect of the present disclosure.

One of the more extreme cases is exhibited in FIG. 13, with $\alpha$ set to 0° and $\beta$ set to 10°. As shown, the worst upper sidelobe has an amplitude of approximately 11 dB, and there is a tilt error of only 0.2°, which is still of acceptable quality. From the above discussed scenarios, it can be seen that even when the respective set tilt values, $\alpha$ and $\beta$, associated with different frequency bands vary, the radiation patterns are still of acceptable quality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative components and associated functionality described in connection with the various aspects of the disclosure may be implemented as electronic hardware, computer software, or combinations of both. Skilled artisans may implement the described functionality in varying ways for each particular application, but such implementation decisions should not be interpreted as causing a departure from the scope of the present disclosure.

The various functionalities described in connection with the various aspects of the present disclosure disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As used herein, "input", "output", and some other terms or phrases refer to the transmit signal path. However, because the structures described herein may be passive components, the networks and components also perform reciprocal operations in the receive signal path. Therefore, the use of "input", "output", and some other terms is for clarity only, and is not meant to imply that the diplexed antennas do not operate concurrently in both receive and transmit directions.

Various aspects of the present disclosure have now been discussed in detail; however, the invention should not be understood as being limited to these specific aspects. It should also be appreciated that various modifications, adaptations, and alternative embodiments thereof may be made within the scope and spirit of the present invention.

What is claimed is:

1. An antenna configured to operate in at least two radio frequency (RF) bands including a first RF band and a second RF band, the antenna comprising:

a first coarse phase shifter and a second coarse phase shifter, wherein the first coarse phase shifter is independently adjustable from the second coarse phase shifter, and wherein the first coarse phase shifter is configured to provide a first contribution on a first tilt associated with the first RF band, and wherein the second coarse phase shifter is configured to provide a second contribution on a second tilt associated with the second RF band;

a first diplexer, a second diplexer, and a third diplexer, wherein each of the first diplexer, the second diplexer, and the third diplexer is coupled to the first coarse phase shifter and to the second coarse phase shifter;

a first fine phase shifter coupled to the first diplexer;

a second fine phase shifter coupled to the second diplexer; and a third fine phase shifter coupled to the third diplexer, wherein the first fine phase shifter, the second fine phase shifter, and the third fine phase shifter are coupled to one or more radiating elements.

2. The antenna of claim 1, wherein the first fine phase shifter and the second fine phase shifter are configured to provide a third contribution on both the first tilt and the second tilt.

3. The antenna of claim 1, wherein the first, second, and third fine phase shifters are configured to provide a third contribution on both the first tilt and the second tilt.

4. The antenna of claim 3, wherein the third contribution comprises a combination of the first contribution and the second contribution.

5. The antenna of claim 1, wherein the first coarse phase shifter is configured to apply a first phase shift to a first signal coupled to the first diplexer and is configured to apply a second phase shift to a second signal coupled to the second diplexer, wherein the first phase is different from the second phase.

6. The antenna of claim 1, wherein one or more of the first and second coarse phase shifters comprises a wiper arc phase shifter.

7. An antenna configured to operate in at least two radio frequency (RF) bands including a first RF band and a second RF band, the antenna comprising:

at least one first coarse phase shifter configured to provide a first contribution on a first tilt associated with operation in the first RF band;

at least one second coarse phase shifter configured to provide, independent of the first contribution, a second contribution on a second tilt associated with operation in the second RF band;

at least one first diplexer and at least one second diplexer, each of the at least one first and at least one second diplexers being coupled to the at least one first and at least one second coarse phase shifters;

at least one first fine phase shifter coupled to the at least one first diplexer; and at least one second fine phase shifter coupled to the at least one second diplexer, the at least one first fine phase shifter and the at least one second fine phase shifter being coupled to one or more radiating elements, wherein the at least one first and at least one second fine phase shifters are configured to provide a third contribution on both the first tilt and the second tilt.

8. The antenna of claim 7, wherein the third contribution comprises a combination of the first contribution and the second contribution.

9. The antenna of claim 7, further comprising:

at least one third diplexer coupled to the at least one first and at least one second coarse phase shifters; and at least one third fine phase shifter coupled to the at least one third diplexer.

10. The antenna of claim 9, wherein the at least one first, at least one second, and at least one third fine phase shifters are configured to provide the third contribution on both the first tilt and the second tilt.

11. The antenna of claim 7, wherein the at least one first coarse phase shifter is configured to apply:

a first phase to a signal coupled to the at least one first diplexer; and a second phase to a signal to the at least one second diplexer, the first phase being different from the second phase.

12. The antenna of claim 7, wherein one or more of the at least one first and at least one second coarse phase shifters comprises at least one wiper arc phase shifter.

13. The antenna of claim 7, wherein one or more of the at least one first and at least one second fine phase shifters comprises at least one sliding dielectric phase shifter.

14. A method for operating an antenna in at least two radio frequency (RF) bands including a first RF band and a second RF band, the method comprising:

receiving first and second RF signals associated respectively with the first and second RF bands;

first coarse phase shifting the first RF signal to output:

(a) a first phase shifted signal having a first phase, and (b) a second phase shifted signal having a second phase different from the first phase, wherein the first coarse phase shifting results in a first contribution on a first tilt associated with the first RF signal;

second coarse phase shifting the second RF signal to output:

(a) a third phase shifted signal having a third phase, and (b) a fourth phase shifted signal having a fourth phase different from the third phase, wherein the second coarse phase shifting results in a second contribution, independent of the first contribution, on a second tilt associated with the second RF signal;

diplexing the first, second, third, and fourth phase shifted signals to provide a first diplexed signal and a second diplexed signal; and fine phase shifting the first and second diplexed signal, wherein the fine phase shifting results in a third contribution on both the first tilt and the second tilt.

15. The method of claim 14, wherein the third contribution comprises a combination of the first contribution and the second contribution.

16. The method of claim 14, wherein the diplexing comprises diplexing the first and third phase shifted signals to provide the first diplexed signal.

17. The method of claim 14, wherein the diplexing comprises diplexing the second and fourth phase shifted signals to provide the second diplexed signal.

18. The method of claim 14, wherein the first coarse phase shifting and the second coarse phase shifting are performed respectively by a first wiper arc phase shifter and a second wiper arc phase shifter.

19. The method of claim 18, wherein the fine phase shifting is performed by a sliding dielectric phase shifter.

20. The antenna of claim 1, wherein one or more of the first and second fine phase shifters comprises a sliding dielectric phase shifter.

* * * * *